US007536336B1

(12) United States Patent
Guinan

(10) Patent No.: US 7,536,336 B1
(45) Date of Patent: May 19, 2009

(54) MULTI-PARTY ELECTRONIC TRANSACTIONS

(75) Inventor: Daniel J. Guinan, Redwood Shores, CA (US)

(73) Assignees: PayPal, Inc., San Jose, CA (US); PayPal International Limited, Dublin (IE)

( * ) Notice: Subject to any disclaimer, the term of this patent is extended or adjusted under 35 U.S.C. 154(b) by 0 days.

(21) Appl. No.: 09/575,088

(22) Filed: May 19, 2000

(51) Int. Cl.
*G06Q 40/00* (2006.01)
(52) U.S. Cl. ............................................ 705/37; 707/6
(58) Field of Classification Search .................. 705/26, 705/37, 80
See application file for complete search history.

(56) References Cited

U.S. PATENT DOCUMENTS

| | | | | |
|---|---|---|---|---|
| 3,581,072 | A * | 5/1971 | Nymeyer | 705/37 |
| 4,378,942 | A * | 4/1983 | Isaac | 273/278 |
| 4,789,928 | A * | 12/1988 | Fujisaki | 705/37 |
| 5,629,982 | A * | 5/1997 | Micali | 380/30 |
| 5,640,569 | A * | 6/1997 | Miller et al. | 710/241 |
| 5,664,111 | A * | 9/1997 | Nahan et al. | 705/27 |
| 5,826,244 | A * | 10/1998 | Huberman | 705/37 |
| 6,041,308 | A * | 3/2000 | Walker et al. | 705/14 |
| 6,178,408 | B1 * | 1/2001 | Copple et al. | 705/14 |
| 6,269,343 | B1 * | 7/2001 | Pallakoff | 705/26 |
| 6,292,830 | B1 * | 9/2001 | Taylor et al. | 709/224 |
| 6,321,212 | B1 * | 11/2001 | Lange | 705/37 |
| 6,336,105 | B1 * | 1/2002 | Conklin et al. | 705/80 |
| 6,338,050 | B1 * | 1/2002 | Conklin et al. | 705/80 |
| 6,466,918 | B1 * | 10/2002 | Spiegel et al. | 705/27 |
| 6,604,089 | B1 * | 8/2003 | Van Horn et al. | 705/26 |
| 6,886,000 | B1 * | 4/2005 | Aggarwal et al. | 705/80 |
| 2001/0034689 | A1 * | 10/2001 | Heilman | 705/37 |
| 2003/0195759 | A1 * | 10/2003 | Glassco et al. | 705/1 |

* cited by examiner

*Primary Examiner*—Thu Thao Havan
(74) *Attorney, Agent, or Firm*—Kenyon & Kenyon LLP

(57) ABSTRACT

A system is provided for facilitating the closure of a multi-party transaction consisting of multiple offers. In this system, atomic offers are generated by or on behalf of parties that produce or provide basic goods or services or other things of value. A broker, supplier, dealer, purchaser or other party may aggregate multiple offers (including atomic offers and other aggregated offers) to form a multi-party offer. Offers may be initiated by buyers as well as sellers and, when a buyer's and a seller's offers match (e.g., on price and/or other terms), a zero-sum offer is generated and the multi-party transaction can be closed. Closing a transaction involves a first stage in which payment of the agreed-upon funds and shipment of goods/services are authorized. More particularly, the availability of the funds and the goods/services are verified. In a second phase the funds are committed and the goods/services are obligated by being held for shipment or performance. Finally, the funds are remitted to each supplier, broker and other intermediary that provided value after shipment and or delivery are verified. Advantageously, closure of the transaction allows collective settling of all the offers included in the transaction rather than requiring each to be settled separately.

18 Claims, 8 Drawing Sheets

MULTI-PARTY ELECTRONIC TRANSACTIONS

BACKGROUND

This invention relates to the fields of computer systems and electronic commerce. More particularly, a system and methods are provided for facilitating an electronic commerce transaction involving multiple parties.

Existing electronic commerce systems primarily implement catalog models of business, wherein a selling party presents a list of products or services to a potential buyer. The buyer is limited to reviewing the list as he or she would peruse a catalog in a traditional "brick and mortar" establishment. These electronic commerce systems thus merely mimic only the most primitive or basic commercial transactions.

In contrast, most "real world" commerce involves more than one seller and one buyer. In particular, intermediaries are often involved in combining, assembling or aggregating products or services offered by different suppliers until, finally, the buyer accepts an offer consisting of one possible combination of the goods/services. Thus, before the consumer chooses to buy something from the seller, there may have been numerous other transactions to enable or support the final sale.

Unfortunately, each of those transactions are typically performed in the same manner as the final sale. Each intermediate party (e.g., retailer, distributor, wholesaler) may transact with another party (e.g., broker, manufacturer, service provider) to buy or sell a component of what the buyer ultimately purchases. This is inefficient because of the amount of effort that must be applied to arrange and complete each intermediate transaction. More specifically, each intermediate transaction must be separately negotiated and closed before the next one can be conducted.

The chain of transactions is also rather rigid, in that each intermediate transaction may be structured in accordance with past transactions rather than allowing for different combinations of components that have not been previously attempted. In particular, an intermediate broker or other party cannot offer a novel combination of goods and/or services that may be attractive to a different buyer.

Thus, what is needed is a system and method for facilitating the construction or assembly of multi-party transaction offers by or on behalf of manufacturers, suppliers, producers, distributors, consumers, etc. The flexible creation of unique and custom offers would be enabled, along with the creation of basic and repeatable transactions.

What is also needed is a system and method for closing a multi-party transaction whereby each party's obligations may be dependent upon the acceptance of a top-level offer that is an aggregation of multiple lower-level offers. At closing, the system would ensure disbursement of the necessary value (e.g., money) to the various parties and ensure fulfillment of each performer's obligations.

SUMMARY

In one embodiment of the invention a system and method are provided for closing a multi-party transaction offer consisting of multiple offers that have been aggregated by an intermediary. In this embodiment atomic offers are generated by or for providers of basic, low-level, goods and services. Intermediaries form aggregate offers by combining atomic offers and/or other aggregated offers. Offers may flow from the supply or demand side (i.e., from product/service providers or from purchasers). An offer to sell or purchase a good, service or combination of goods/services may be generated based on known or perceived demand, wherein the various suppliers and buyer(s) are unaware of each other.

In an embodiment of the invention an offer is constructed to include terms under which the offeror is willing to provide a good or service or pay for a good or service. The offer may be placed in a marketplace configured for listing offers of a certain type (e.g., for a specific organization, a line or type of business) or for any entity having access to the marketplace. The offer may then, if its terms and/or the rules of the marketplace allow, be aggregated with another offer of the same or different marketplace. The intermediary that creates the aggregated offer may publicize it via any electronic or personal communication method.

An aggregated offer may take the form of a software or data construct embodying the terms and descriptions of each contained offer. Thus, the aggregated offer identifies the value being provided by the offer (e.g., a good or service having a price, an amount that a buyer is willing to pay for a good or service) as well as any terms set by the offerors. If the aggregated offer is listed in a marketplace, the marketplace may encompass default rules and other conditions.

In a present embodiment of the invention a closable transaction is formed when an offer (which may or may not be an aggregate offer) to provide or do something is matched or combined with an offer to purchase or pay for the something. If the terms match or are otherwise acceptable to the parties the closing may commence with an attempt to authorize each party's obligations. In particular, checks are made to determine if the purchaser can and will pay (e.g., has sufficient funds) and if the seller(s) or provider(s) can perform their obligations. If the transaction passes authorization, then the system attempts to commit the resources involved in the transaction (e.g., by charging the purchaser's account (e.g., credit card), placing holds on the offered goods or services). If the commitment phase succeeds then the transaction is finalized and the purchaser's funds are remitted (e.g., disbursed to each supplier or provider).

DETAILED DESCRIPTION

Figure 1:
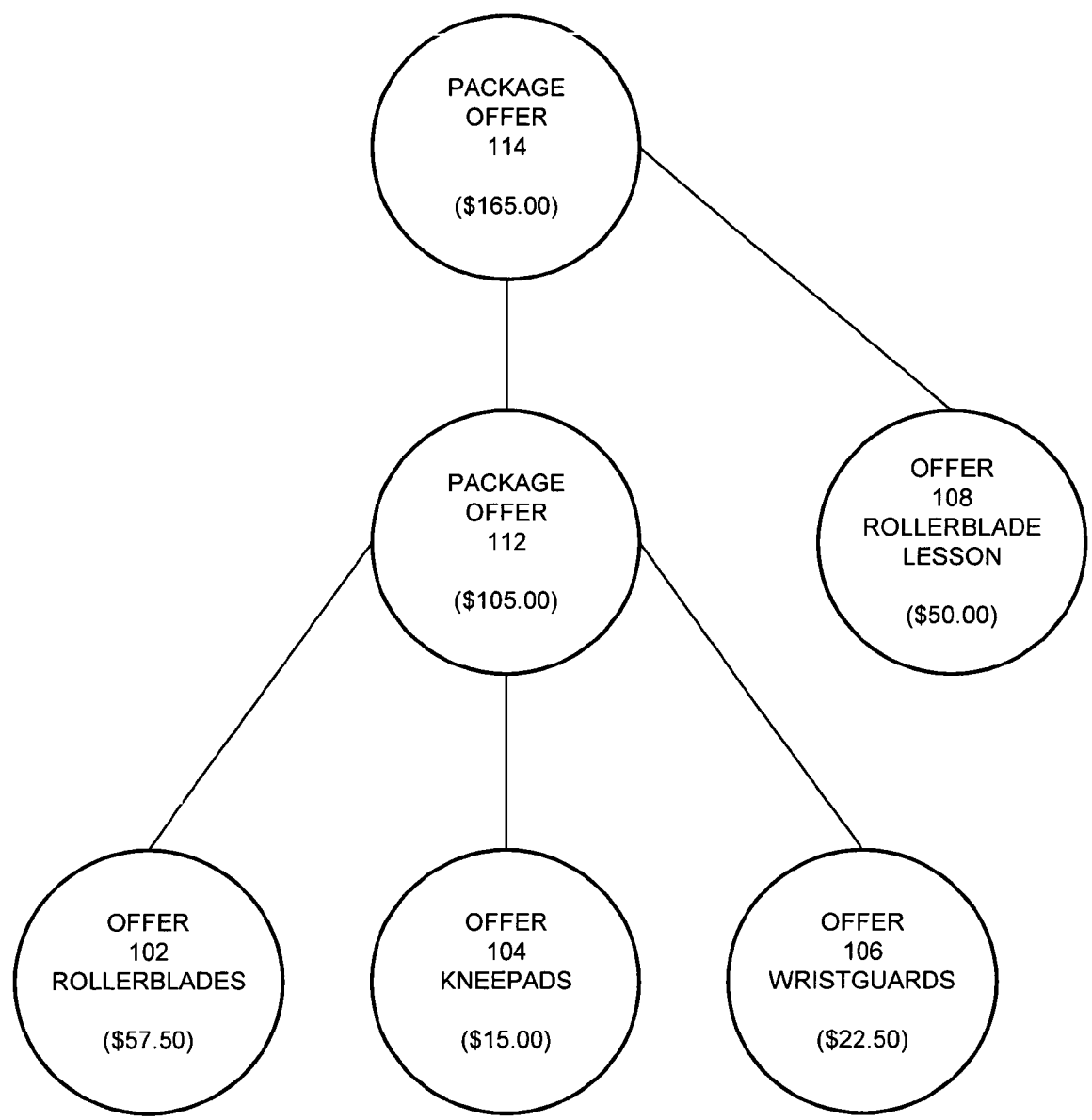
FIG. 1 is a block diagram depicting one form of a multi-party transaction offer in accordance with an embodiment of the present invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer. Details of such devices (e.g., processor, memory, data storage, display) are omitted for the sake of clarity.

It should also be understood that the techniques of the present invention might be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a storage medium such as a carrier wave, disk drive, or computer-readable medium. Exemplary forms of carrier waves may take the form of electrical, electromagnetic or optical signals conveying digital data streams along a local network or a publicly accessible network such as the Internet.

Existing business models implemented in electronic environments, such as that of the Internet and the World-Wide Web, generally involve a single seller and a single buyer. Typically, these parties engage in a catalog-type transaction in which the buyer selects and purchases a product or service offered by the seller.

From a functional or supply view, the seller is usually situated relatively close to the original manufacturer or provider of the goods or services and the sale to the buyer is just one more in a series of one-to-one transfer of the good or service. Thus, the purchaser may be limited to obtaining the good or service in its original form or with whatever slight addition of value or function the seller may have contributed. In any case, the purchaser is limited to the one form or package in which the good or service is offered, which form may be inflexibly determined by the sequence of entities through which the good or service has passed on its way to the purchaser. If the purchaser desires additional value or functionality, he or she must conduct separate transactions with other sellers/providers.

Even where a purchaser meets with an opportunity to obtain a combination of goods and/or services, the purchaser deals with a single entity to carry out the transaction. The combination obtained by the purchaser was likely to have been created before the purchaser appeared, and thus did not consider his or her personal needs or desires. The entity with which the purchaser transacts may, in support of the transaction, interact with other parties to arrange shipping, financing, or other activity. These activities are conducted in a serial manner, however, and require separate action, negotiation, etc.

It can therefore be seen that existing transaction methods do not allow multiple parties or their interests to coalesce to form a multi-party transaction in which each aspect of the transaction (including each good or service, payment of funds, shipping, financing, etc.) is settled. One consequence of conducting the steps of a transaction in serial manner is the length of time involved in completing the transaction.

In general, present electronic commerce models do not allow the flexible aggregation of component goods or services, or offers for such goods or services, into a multi-party transaction that can be finalized or closed collectively rather than serially. More particularly, in existing electronic commerce systems the individual, one-to-one, exchanges that contribute to a later sale are conducted autonomously and independently of any other exchanges that lead to the later sale. Thus, a party requiring or desiring several goods or services generally has no alternative but to separately negotiate and conduct the separate exchanges.

Therefore, in one embodiment of the invention a framework or method is provided for electronically representing a multi-party transaction (MPT) comprising multiple individual offers that can be closed collectively. In comparison to a traditional transaction conducted in a serial manner, an MPT may be conducted much faster. In another embodiment of the invention a method is provided for constructing a multi-party transaction or multi-party offer (MPO) or aggregating multiple offers. In yet another embodiment of the invention a system and method are provided for closing an MPT, a process during which payment may be captured and disbursed to suppliers and the suppliers' delivery or performance of goods or services are assured.

The scope of the invention is not limited to the embodiments described herein, however, which may be altered or adapted for different goods or services, organizations, transaction terms, electronic environments, etc. For example, an embodiment of the invention may be designed for barter transactions involving the exchange of goods/services for goods/services, without the use of cash. Another embodiment may be implemented for currency exchange transactions in which one form or amount of cash is exchanged for another. Yet other embodiments may be designed for various types of monetary or financial instruments (e.g., securities, loans, stocks, bonds, promissory notes, guarantees) and/or cash.

Multi-Party Offers and Transactions

A present embodiment of the invention allows two or more parties or entities to be involved in a single transaction that may comprise or encompass multiple offers. Thus, an MPT (multi-party transaction) in one embodiment of the invention may include a buyer, a seller and one or more brokers or other intermediaries who can add additional value to the deal. One advantage of the invention in this embodiment is that goods and services become more widely available. For example, through the third-party broker an offer to buy or sell a good or service may be presented to and accepted by a party who may not otherwise have learned of its availability.

In this embodiment of the invention atomic offers are created by or on behalf of parties offering, making or providing basic value (e.g., a manufacturer of a basic good, a performer of a basic service, an end consumer offering to buy a particular good or service). Atomic offers may be accepted and closed in one implementation of this embodiment, but in another implementation one or more intermediaries (e.g., distributors, brokers, dealers, agents) build or present higher-level offers constructed from atomic offers and/or other higher-level offers. An MPO (multi-party offer) may therefore include any combination of atomic and higher-level offers and, if it is accepted and closed in an MPT, the included offers are also closed.

A multi-party transaction may encompass more than one product, service or other value. Among the many applications of the present system, brokers may aggregate products from many suppliers for one purchaser, aggregate multiple services (e.g., hotel stay, airfare, sight-seeing tour) for a buyer, translate or otherwise alter information for presentation in a different (e.g., more attractive) format, etc.

Typically, value is added to an MPT each time an offer is combined with another. The type of value added is not limited and can be whatever a seller or purchaser desires, and take virtually any form. The actors involved in an MPT are not limited to buyers and sellers; in particular, intermediaries of various forms may also add value. Additional value may arise from simply combining two complementary offers, such as a piece of electronic equipment with a maintenance agreement for the equipment. Other value may lie in a broker's ability to distribute or present an offer to a larger or more suitable audience. Value may be added by converting one form of currency to another, or one type of financial or monetary instrument to another. Value may be added in the form of an endorsement, certification, advertisement, re-packaging or other representation of a previous offer.

In a present embodiment of the invention an atomic offer is defined as a basic offer for a fundamental good or service and includes no other offers. A higher-level offer includes one or more other offers and may also be termed a package, intermediate or aggregate offer. In a chain of aggregated offers the top-level offer is the offer that includes or encompasses the others, and is usually the last one added to the chain. A multi-party offer (MPO) is any offer involving multiple parties and may include both atomic and aggregate offers. A multi-party transaction (MPT) in this embodiment comprises balancing or matching offers that can be closed collectively. For example, an MPO may be composed of a series of offers aggregated by one or more brokers. A counter or matching offer may be received that meets the price and/or other terms of the MPO, in which case a closable MPT is formed. The counter-offer that enables or creates the MPT may be considered to encompass the MPO.

As described further below, the matching counter-offer may be termed a zero-sum offer in an embodiment of the invention in which each offer has an associated, signed, value indicating whether value payment (e.g., money, credit, other value) is being offered in return for goods/services (e.g., by a consumer) or is being solicited in exchange for goods/services (e.g., by a supplier). Illustratively, values are of one or the other sign (i.e., positive or negative) depending on the direction of the flow of the proceeds of the transaction and the value of a zero-sum offer, when combined with the values of the offers encompassed by the zero-sum offer, sum to zero.

Thus a zero-sum offer may be created when the aggregate or accumulated value, of each type, offered into an MPO exactly matches and offsets the aggregate or accumulated value requested from the MPO. Execution of the MPO through an MPT will thus satisfy each party involved in the MPO. Thus, in a cash-based embodiment of the invention the total amount of cash requested by suppliers, brokers and other parties requesting payment in exchange for goods/services will be exactly offset by the amount of cash offered by consumer(s) and/or other parties for the goods/services. In a barter-based embodiment of the invention the total number of each type of good or service offered/requested by the various parties will similarly offset. Thus, in a barter MPO, all quantities specified in offers to provide good A and service B will be exactly offset in offers to provide other goods/services in exchange for good A and service B.

A supplier is an individual or organization that provides the goods and services that are represented by offers in the multi-party transaction system. A broker is an individual or organization that can offer and sell the goods and services provided by suppliers. The broker may create, aggregate and accept orders on behalf of suppliers and/or consumers. Consumers are individuals and organizations that purchase the goods and services. A consumer need not be an end consumer. One role of the broker is to act as an intermediary between one or more suppliers and one or more consumers in order to exchange the suppliers' goods and services for other value (e.g., money). A present embodiment of an MPT system also includes a facilitator that closes or supervises the closing of an MPT. Payment from a consumer is collected by the facilitator and disbursed to the suppliers in return for proper assurance or proof of their delivery or performance.

Any of the parties to an MPT (i.e., supplier, broker, consumer) may be a distributor, wholesaler, retailer, value-added reseller (VAR), manufacturer, user or other entity. Any party or entity creating, selling, using, consuming or handling a good or service may act within the provided system to create a new offer, alter an existing offer (e.g., by adding a new item), close an offer (e.g., accept it), combine multiple offers, etc. Any number of offers for any number and type of goods, services and other things of value, both tangible and intangible, can be included in a package offer—including other package offers.

For example, an atomic offer to sell a first basic component may be generated by a manufacturer, refiner, service provider or other entity. That first basic component offer may then be combined, by a broker, with an offer for a second basic component produced by another manufacturer to create a first package offer. Another broker (e.g., a distributor or VAR) may aggregate the package offer with offers for other goods or services in order to assemble or generate a new, higher level offer, and so on. Or, a consumer may accept the package offer in an MPT, in which case the facilitator helps close the transaction.

In another embodiment, however, the offers may be offers to buy (i.e., rather than sell) goods, services or other value. Thus, a consumer may authorize or create an offer to buy a vacation, possibly including some preferred elements or activities (e.g., scuba diving, hotel, rental car). A travel agent or other broker may access that offer or generate it on behalf of the consumer. In an attempt to satisfy the consumer's needs the agent may generate atomic offers to buy a scuba vacation, a week's stay in a hotel, a week's use of a rental car, etc., or a package offer for some combination of the consumer's needs. The travel agent or consumer may learn of or receive atomic offers or counter-offers in return (e.g., from a scuba shop, from a hotel) or, for example, a tour provider may respond to multiple components of the consumer's offer (e.g., hotel and rental car) with an aggregate offer. The consumer or agent may learn of the offer(s) by browsing the Internet, by word of mouth, electronic mail or any other means of receiving information. To extend the example yet further, an insurance agent may offer travel or vacation insurance as a supplement to the vacation. The consumer's travel agent may thus act as a broker to aggregate various offers for different elements of the vacation. Offers can thus be aggregated or dis-aggregated and may flow in either direction (toward or from consumers).

The combination or aggregation of offers to create, extend or otherwise revise an MPO may change the informational content and/or the shape of the MPO, but does not close or settle any of the offers.

As described above, in one method of conducting a multi-party transaction an offer may be closed when it is combined into a zero-sum offer by adding to the MPO a matching offer or a counter-offer. Thus, in the vacation transaction described above, the travel agent or consumer's offers are closeable when an entity responds with a zero-sum offer for the same item or service with matching terms (e.g., price, dates, location). At this time the MPT facilitator may facilitate closure by receiving payment from the consumer and holding it until verification or assurance of performance/delivery of the vacation is received. For example, the consumer may accept an MPO embodying an attractive vacation package and initiate closure of the transaction by providing payment information (e.g., credit card number, EFT data, account number) to the facilitator. The facilitator may then distribute payment to the providers of the counter-offer(s) and the suppliers of the various elements of the vacation package. The facilitator may be a broker, one of the suppliers, the consumer or, in a present embodiment of the invention, a party not otherwise involved in the MPT (other than in a facilitation role).

Illustratively, when an offer is created a method or mechanism for closing that offer is identified. For example, an offer to pay money in exchange for something may provide a credit card number that will be charged when an MPT involving the offer is closed. An offer to provide a good or service in exchange for something may identify a method of notifying the offeror that its offer is closing and that the offeror is to make good on its obligation(s). Thus, when an MPT closes, the methods and mechanisms identified for closing each offer and fulfilling each party's obligation are invoked (e.g., by the facilitator). As described further below, this may involve multiple stages in order to reduce risk, comply with applicable laws, lessen the chance of dispute, etc.

When an MPT is closed, one type of value (e.g., money) may flow in one direction and another type of value (e.g., a good, service, something else) in the other direction. Thus, for an MPT involving the above vacation package, for example, the purchaser provides payment to the facilitator. From this facilitator, the funds flow to each provider/supplier/broker of offers included in the multi-party vacation offer. In a similar manner, each of the providers/suppliers is informed of its obligations and any necessary details (e.g., dates for travel or hotel accommodations; amount of insurance; number, type, quantity of widgets purchased).

Although one or more embodiments described herein involve collection of funds by the facilitator, this is not necessary for all cash-based embodiments. Other entities may handle the collection of money, in whatever form (e.g., credit, debit, cash, other financial instruments), although the facilitator may still be involved in directly the flow of monetary payments.

Illustratively, each offer in an MPO includes terms relating to the offered good, service or payment. Terms of an offer may be set by the offeror, a broker that makes or aggregates the offers or a third party providing a forum in which to list or conduct the offers. Terms of an offer and/or action taken during closure of an MPT may also adhere to business rules set by the parties or MPT facilitator(s). For example, products may have to be shipped (and verification of shipping received) before a facilitator tenders payment to a supplier, sufficient purchaser funds or financing may have to be verified before goods are committed for shipment, etc.

With reference now to FIG. 1, an illustrative chain of offers is depicted which culminates in an MPO ready for acceptance by a consumer. Offer hierarchy 100 of FIG. 1 consists of four atomic offers 102, 104, 106, 108 and two higher-level package offers—offers 112, 114. The atomic offers are initiated by or on behalf of suppliers, which may be manufacturers, service providers, distributors, retailers or other providers of the indicated items. Thus, the products embodied in atomic offers 102, 104, 106 are offered by specific suppliers of rollerblading paraphernalia. The same supplier may be the offeror of each of offers 102, 104, 106 or different suppliers may be involved. Atomic offer 108 is associated with a supplier of rollerblading lessons. Illustratively, the price associated with each atomic offer is set by the provider of the good/service or the broker that created the offer.

Package offer 112 is assembled by a first broker, agent or other party, and includes a pair of rollerblades, a pair of kneepads and a pair of wristguards. The price associated with package offer 112 includes the cost of atomic offers 102, 104, 106 plus a profit, margin or fee charged by the broker that created package offer 112. Similarly, package offer 114 is assembled by a broker that perceives a market for the package offered by the first broker when combined with an initial rollerblading lesson. The price associated with package offer 114 includes the costs of package offer 112, atomic offer 108 and a fee charged by the broker that aggregated them into package offer 114. The two brokers may or may not be the same entity.

Depending where or how the offers of FIG. 1 are placed or listed, just the top-level offer (i.e., package offer 114) may be listed, just the package offers may be listed, all offers may be listed, etc. The rules of the system or electronic environment in which the offers are placed may specify what users or parties may see which offers or types of offers. In one particular embodiment of the invention, however, only the creator of a package offer may see or access any offers included in the package offer. Similarly, any entity that can view atomic or other lower-level offers may be prohibited from accessing package or higher-level offers in which the atomic or lower-level offers may be aggregated.

For the purpose of determining access to offers, and/or other purposes as well, the offers may be categorized or treated differently according to whether they are atomic or package offers, whether they are for a particular industry or business, etc. Access to the offers or the location where the offers are listed may depend upon a visitor's identity, organization, line or type of business, whether they are authorized to combine offers, whether they are restricted to creating or accepting offers, etc. Yet further, individual offers, when created, may be configured to allow or dis-allow combination with other offers, to allow access (e.g., viewing of the offer) only to certain parties or types of parties (e.g., consumers, brokers), to allow access depending on whether the offer has been combined or aggregated into a package, etc. In short, virtually any aspect of access to an MPO or the system in which it is listed may be limited or allowed by the rules of the system, the terms of the offer or choice of the offer creator, etc., and may depend upon various aspects of the visitor desiring access (e.g., identity, type or line of business, past dealings).

Offers may be listed, viewed or accessed in online catalogs, an electronic bidding marketplace, a RFQ (Request For Quote) system, an entity's world-wide web site or other electronic environment, etc.

In one or more embodiments of the invention cryptographic or other security techniques may be applied to secure offers and sub-offers. In particular, because a multi-party transaction system of a current embodiment is distributed in nature, regardless of where an offer is created it may be located or represented virtually anywhere in the distributed system, such as on a site where it was wrapped or aggregated in a package offer. It may therefore be important to restrict access to the offer, for example, if only the top-level or package offer should be viewable.

In one embodiment of the invention offers are constructed in XML (eXtensible Markup Language) to promote transportability and interoperability. In this embodiment the relevant portion of XML code for package offer 114 may appear as indicated in TABLE 1. Normally, a package offer includes references to its sub-offers (e.g., identifying a messaging server or other system associated with the sub-offer). These references are omitted from TABLE 1 for the sake of clarity.

TABLE 1

```
<offer id="54321@mpti.nanobiz.com">
   <value amt="-10.00" total="-165.00" type="USD"/>
   <value amt="0" total="1" type="product" ref="122" name=
   "Rollerblades"/>
   <value amt="0" total="1" type="product" ref="233" name=
   "Kneepads"/>
   <value amt="0" total="1" type="product" ref="344" name=
   "Wristguards"/>
   <value amt="0" total="1" type="service" ref="455" name="Lessons"/>
   <name>Rollerblade Package </name>
   <description>Rollerblades, protective gear and first lesson</description>
   <private>
      <!--Other data, including sub-offers, are listed here-->
   </private>
</offer>
```

In the second line of the sample XML representation, the "value amt" of ten dollars indicates the value added in the top-level offer (i.e., $10 for the bundling of offer bundle 112 and atomic offer 108). The "total" in the second line indicates the total amount that must be paid to satisfy and close the offer (i.e., $165), and is derived by summing the amounts of the sub-offers, which are identified in the third through sixth lines. As described below, in a full representation of package offer 114, XML code for each sub-offer would be included in package offer 114, but may or may not be viewable, depending on the security applied to package offer 114 and the sub-offers, the level of access or visibility granted to the entity attempting to access the offer or sub-offer, etc.

The "value amt" and "total" of the second line of TABLE 1 are expressed negatively to indicate that when MPT involving package offer 114 is closed, the respective amounts are received by the suppliers from the system. The second line also indicates that the currency is expressed in U.S. dollars.

A balancing counter-offer (i.e., to buy the rollerblade package of package offer 114) will indicate a positive value of $165 and a negative value for the rollerblade package, indicating that the counter-offeror is offering payment in return for the described goods/services. Closure of an offer is thus easily detected because matching offers and counter-offers will sum to zero. In particular, and as illustrated below in FIG. 2, a counter-offer that satisfies the terms of package offer 114 will have a positive value of $165 and a negative value for rollerblade package. The counter-offer may be termed a zero-sum offer.

In the third through sixth lines, in which the sub-offers are referenced, each "amt" is equal to zero, which indicates that the corresponding value is inherited from the sub-offer. The "total" figures indicate the number of each product or service from the sub-offer that are included in the package offer and are expressed positively to indicate that the product or service is being provided, not extracted. A matching counter-offer will have negative values for the products/services (along with a positive dollar amount) to indicate that the counter-offer wishes to receive or extract them.

If relevant XML code for the sub-offers is also included, package offer 114 may appear similar to TABLE 2:

TABLE 2

```
<offer id="54321@mpti.nanobiz.com">
   <value amt="-10.00" total="-165.00" type="USD"/>
   <value amt="0" total="1" type="product" ref="122" name=
   "Rollerblades"/>
   <value amt="0" total="1" type="product" ref="233" name=
   "Kneepads"/>
   <value amt="0" total="1" type="product" ref="344" name=
```

TABLE 2-continued

```
   "Wristguards"/>
   <value amt="0" total="1" type="service" ref="455" name=
   "Lessons"/>
   <name>Rollerblade Package </name>
   <description>Rollerblades, protective gear and first lesson</description>
   <private>
   <offer id="344513@mpti.nanobiz.com">
      <value amt="-10.00" total="-105.00" type="USD"/>
      <value amt="0" total="1" type="product" ref="122" name=
      "Rollerblades"/>
      <value amt="0" total="1" type="product" ref="233" name=
      "Kneepads"/>
      <value amt="0" total="1" type="product" ref="344" name=
      "Wristguards"/>
      <name>Rollerblade Gear</name>
      <description>Rollerblades and protective gear </description>
      <private>
      <offer id="887322@mpti.nanobiz.com">
         <value amt="-57.50" total="-57.50" type="USD"/>
         <value amt="1" total="1" type="product" ref="122"
name="Rollerblades"/>
         <name=Rollerblades</name>
         <description=Cool Rollerblades</description>
      </offer>
      <offer id="8789234@mpti.nanobiz.com">
         <value amt="-15.00" total="-15.00" type="USD"/>
         <value amt="1" total="1" type="product" ref="233"
name="Kneepads"/>
         <name=Kneepads</name>
         <description=Excal Kneepads</description>
      </offer>
      <offer id="892384@mpti.nanobiz.com">
         <value amt="-22.50" total="-22.50" type="USD"/>
         <value amt="1" total="1" type="product" ref="344"
name="Wristguards"/>
         <name=Wristguards</name>
         <description=Excal Wristguards</description>
      </offer>
      </private>
   </offer>
   <offer id="8984921@mpti.nanobiz.com">
      <value amt="-50.00" total="-50.00" type="USD"/>
      <value amt="1" total="1" type="service" ref="455" name=
      "Lessons"/>
      <name=Rollerblade Lessons</name>
      <description=First-timer Rollerblade Lessons</description>
   </offer>
   </private>
</offer>
```

The XML code of TABLE 1 and TABLE 2 illustrates one possible form of an MPO and does not limit the scope of the invention or the form(s) in which an MPO may be expressed in different embodiments. In particular, many other details or terms of an MPO or multi-party transaction may be included, such as how/where to submit or receive payment, consumer-selectable features (e.g., color or size of rollerblades, dates of lessons).

Figure 2:
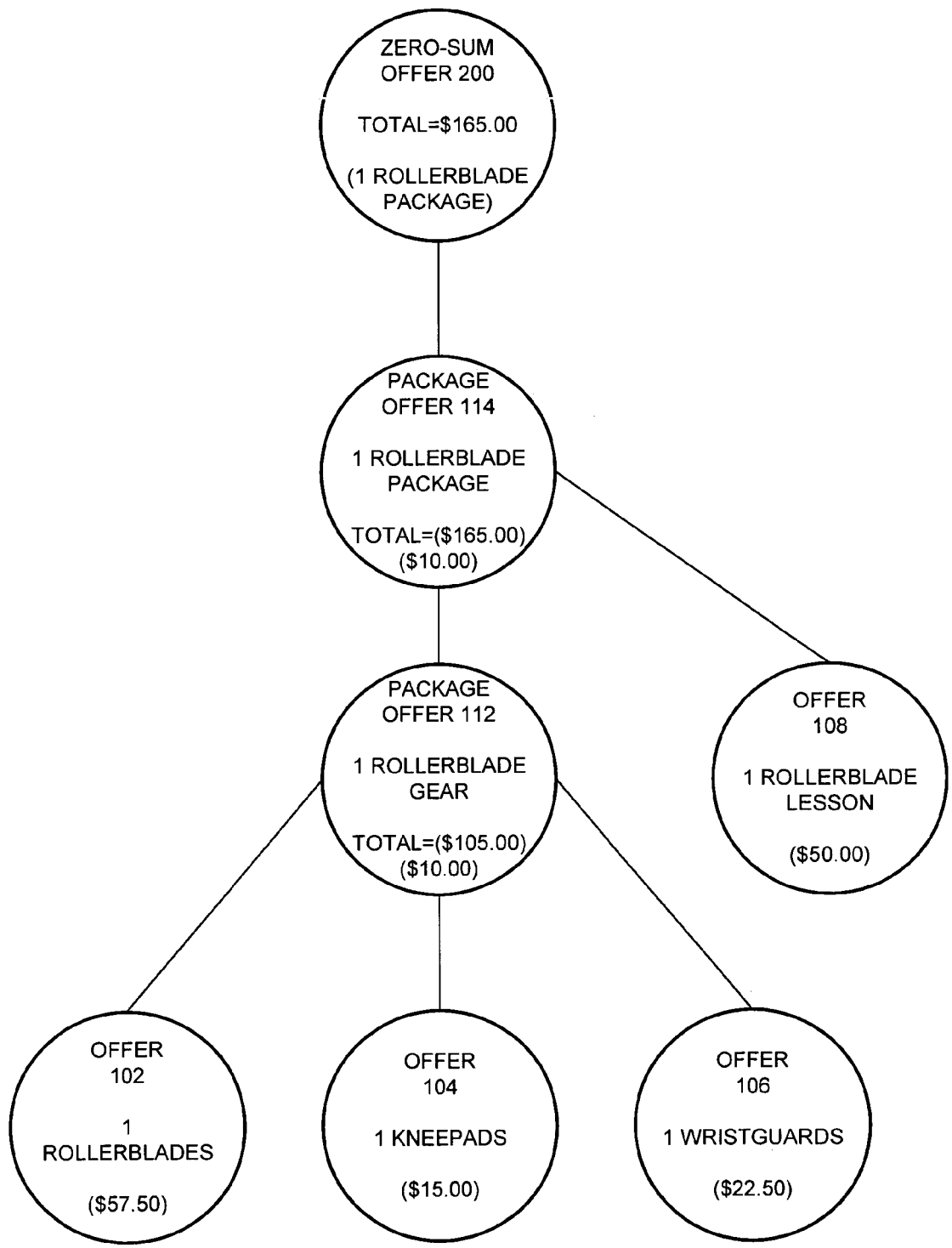
FIG. 2 is a block diagram depicting a closable zero-sum offer for a multi-party transaction in accordance with an embodiment of the invention.

FIG. 2 depicts zero-sum offer 200 offered by a consumer as a counter-offer to MPO 114 of FIG. 1. As described above, offer 200 may be termed a zero-sum offer in one embodiment of the invention because the positive and negative values within the extended offer chain of FIG. 2 sum to zero.

Figure 3:
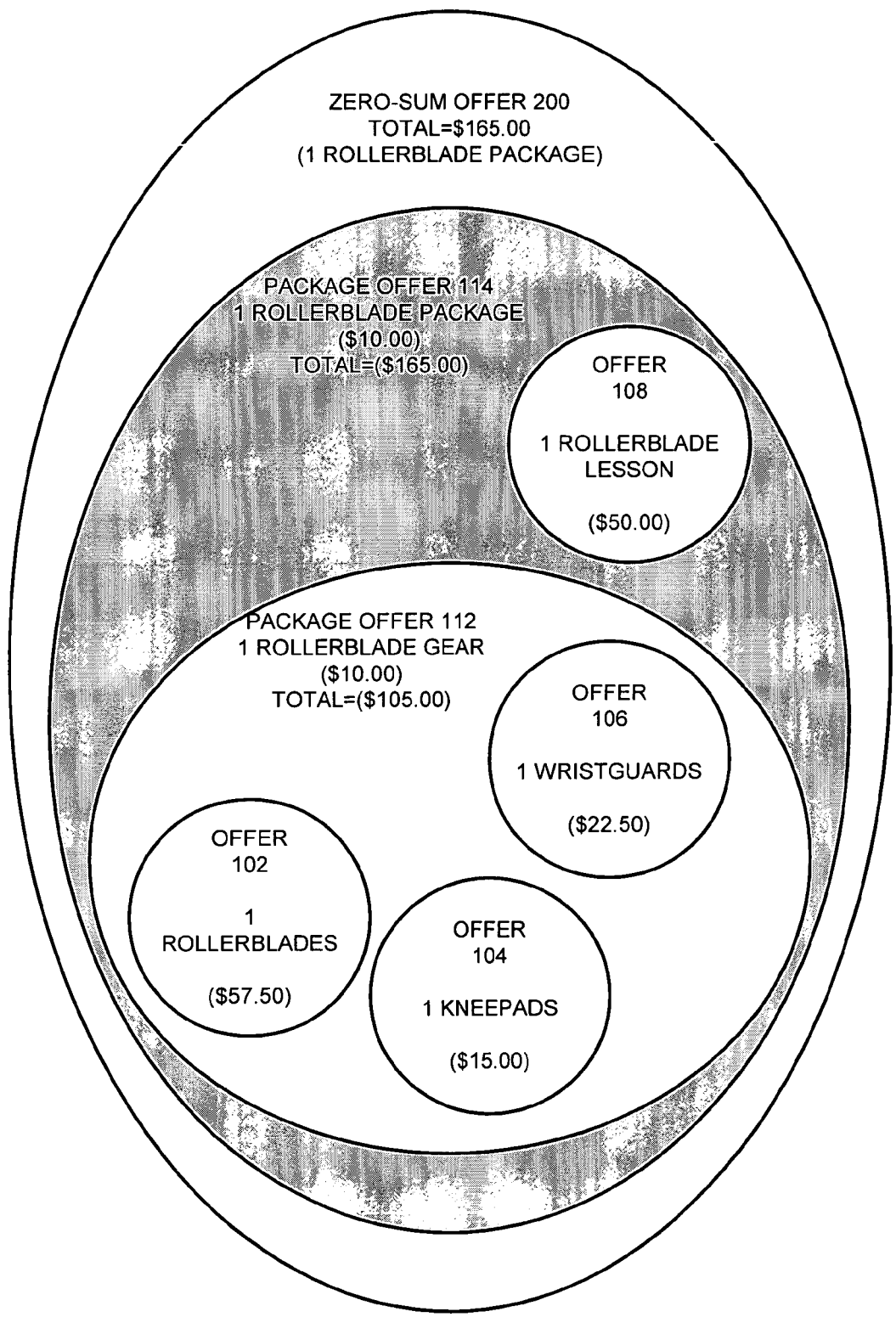
FIG. 3 depicts an alternative representation of the closable zero-sum multi-party transaction offer of FIG. 2, in accordance with an embodiment of the present invention.

FIG. 2 is a hierarchical offer diagram allowing one to represent an MPT as a connection of offers. The diagram of FIG. 2 is derived from the multi-party transaction illustrated in FIG. 1, but includes additional details. FIG. 3 demonstrates an alternative form of representing the MPT of FIG. 2, in which lower-level offers are encapsulated within higher-level offers.

Each atomic offer in FIGS. 2 and 3 (offers 102, 104, 106, 108) identifies with a positive amount the value being offered by a supplier (e.g., a pair of rollerblades, a rollerblading lesson). Each atomic offer identifies with a negative amount the value being requested in exchange (e.g., money).

Package offers 112, 114 and zero-sum offer 200 also use positive amounts for the value they offer and negative amounts for the value being received. Each package offer includes two negative amounts, representing the total amount to be received to satisfy the package offer and the portion, of the total, to be received by the broker or other party that assembled the package offer.

In an embodiment of the invention in which offers are constructed in XML, the relevant portion of zero-sum offer 200 of FIGS. 2 and 3 may appear as shown in TABLE 3, in which the code for offers 102, 104, 106, 108, 112, 114 is omitted for brevity:

TABLE 3

```
<offer>
    <value amt="165.00" total="165.00" type="USD"/>
    <value amt="-1" total="-1" type="product" ref="122" name="Rollerblades"/>
    <value amt="-1" total="-1" type="product" ref="233" name="Kneepads"/>
    <value amt="-1" total="-1" type="product" ref="344" name="Wristguards"/>
    <value amt="-1" total="-1" type="service" ref="455" name="Lessons"/>
    <name>Rollerblade Package Acceptance</name>
    <description>Rollerblades, protective gear and first lesson</description>
    <private>
        <!--Other data, including sub-offers, would be included here-->
    </private>
</offer>
```

As seen in TABLEs 1-3, an offer may consist of attributes and references to sub-offers, which references may or may not be resolved. Thus, for notational purposes, a basic offer with unresolved references may be represented as:

offer={value1 . . . , valueN, name, description, . . . , {offer1', . . . offerN'}} wherein offerN' represents a reference to sub-offer N and valueN the value of the referenced sub-offer. A fully resolved sub-offer may be represented as offerN", in which case an offer in which all sub-offers are resolved (as in TABLE 2) may be noted as:

offer={value1 . . . , valueN, name, description, . . . , {offer1", . . . offerN"}}

As the fundamental building block of an MPT, offers may appear in various forms in various electronic environments. They may be listed in or accessible through specialized or general computing environments. They may take the form of banner advertisements or hyperlinks on a web page, may be interwoven with content, may be injected into a conversation stream in a chat room, etc. They may be accessed via electronic mail, as a post to a newsgroup or other bulletin board, as a message in a message forum, via interactive television, etc. Package offers generated by a broker may, in particular, be targeted to an audience or market with which the broker is familiar. As described previously, an offer may comprise a mixture of supplier information concerning a good or service, and it may also contain content (e.g., product information, research) and hyperlinks or other controls added by a broker.

Advantageously, a broker in an MPT system need not maintain an inventory, need not negotiate or process multiple transactions in order to enable one final sale to a consumer and need not be concerned with shipping products or providing customer service. Instead, the broker can focus on the immediate business and devote additional time and resources to attracting consumers, building a market, experimenting with new products and services, etc. A broker may be given a set of tools for creating and managing offers, tracking the closure and fulfillment of an MPT, etc.

In a present embodiment of the invention one or more marketplaces are established to serve as electronic for a for accessing, generating, closing or otherwise manipulating multi-party offers and transactions. A marketplace may serve an entire industry, a particular line within an industry (e.g., manufacturing aircraft parts), a specific organization, a group of related organizations, one or more levels of a supply chain (e.g., retail, wholesale), or any other community or category of commerce that can be defined. A marketplace may be associated with a type of, or a specific, product, service, activity, etc. (e.g., Barbie dolls, sporting goods, gardening). The scopes or functional areas of marketplaces may overlap, be mutually exclusive or have some other relation. In essence, a marketplace may define or provide a market in which suppliers, consumers and brokers may interact to do business.

A marketplace may be any electronically accessible system or location in which parties (e.g., suppliers and consumers) can be brought together to do business. Some examples include online catalogs, bidding sites, auctions, reverse-auctions, RFP/RFQ systems, etc.

A marketplace may appear (e.g., through a party's web browser or other user interface) as a collection of multi-party offers available at that site, plus other content (e.g., marketplace rules, a message forum). A market director may be assigned to build, monitor, maintain or supervise a marketplace, and a marketplace may set and enforce its own operating rules. A market director may be provided with a set of tools allowing them to control the rules a marketplace activity. A marketplace's rules may encompass business rules for conducting MPTs in the marketplace, required, suggested or default terms for offers in the marketplace, etc. Some default rules or standards may be set for multiple marketplaces (e.g., by a facilitator that handles closure of MPTs).

Illustratively, a marketplace's rules may determine who has access (e.g., only brokers, not consumers) and what type of access, what type of offers (e.g., atomic, package) the marketplace handles or lists, who can create different types of offers, whether new offers may incorporate offers from other marketplaces, whether offers in the marketplace may be replicated or included in offers on other marketplaces, etc. A marketplace director may consider many factors when setting marketplace rules, such as restrictions on suppliers, brokers and consumers, commission restrictions, price ceilings and floors, laws (e.g., local, state, federal), etc. A director may determine the form in which offers are displayed, whether auctioning of offers is permitted, etc.

A marketplace may have default or required transaction terms for offers it lists (e.g., method of payment, delivery terms). Different organizations may receive different levels of access at different marketplaces. A marketplace may be configured to enable or facilitate all phases or aspects of an MPT or any subset thereof. A marketplace intended to allow any entity to supply goods/services, broker them and buy them (e.g., an unrestricted market) may do without a market director.

When a visitor (e.g., supplier, broker, consumer) enters a marketplace, the marketplace may display an offer catalog listing its resident offers, or at least the offers that the visitor is authorized to access. A message board or forum may be provided to enable easy communication between parties. Even a chat capability may be provided for real-time communication, during which offers may be created, altered or accepted.

In order to create an offer, a party merely connects to a selected marketplace and provides pertinent details, such as: product or service, quantity, price, delivery terms, duration of offer, etc. A manufacturer may, for example, create an atomic offer for a particular product (e.g., widgets) that it produces. The marketplace on which the offer is created may be operated by the manufacturer, a distributor/customer of the manufacturer, a broker working in the widget industry, a multi-party transaction facilitator, etc.

An aggregated offer combines one or more offers and may be created by a broker or other entity that perceives demand for the combination. Thus, one intermediary may incorporate the widget manufacturer's offer in its own offer of wheeled widgets. The intermediary may supply or install the wheels itself or its offer may also include an offer from a wheel supplier.

An offer may be included in more than one package offer. Thus, another intermediary may incorporate the widget manufacturer's offer in its offer of winged widgets. And, because packaged offers may, in turn, be included in larger offers, a broker may go further and offer a package deal including both wheeled widgets and winged widgets. Offers that are aggregated to form a package offer need not be located in the same marketplace as the package offer.

Thus, an organization can create new, atomic, offers for its own goods or services and/or package offers that combine goods or services with offers generated by other organizations. The service added may be as simple as packaging, advertising or shipping a good or performing a service, as complex as assembling myriad parts into a new airplane engine or component of a new engine, or anywhere else on the wide range of value perceived by buyers and sellers.

Aggregation of offers may be performed with or without human interaction. For example, a broker dealing in the business of jet engines may employ a marketplace avatar or other program construct or tool to search one or more marketplaces for items needed to build the engines. The avatar or tool may operate according to a modifiable set of rules that dictate what items to look for, what prices are acceptable, any required terms (e.g., deliverable within ten days), any unacceptable terms (e.g., payment in cash), etc. Or, an employee of the broker may visit the various marketplaces and locate the necessary items. Yet further, offers may be advertised or circulated through electronic mail, broadcast, or any other form of electronic communication, whether initiated by a marketplace or a potential transaction participant.

In one embodiment of the invention an organization or operator acting as a market director or as a multi-party transaction facilitator may coordinate or supervise closing activities. This organization may act somewhat as an escrow agent or trusted third party to ensure performance of the parties' obligations (e.g., payment from a consumer, shipment/performance of goods/services by a supplier).

Marketplace computer systems and other systems employed to enable and facilitate an MPT may be centrally grouped or may be distributed. In particular, the multi-party transaction facilitator described above may operate a central or primary system for coordinating marketplace operations and the operations of other equipment within the electronic environment of the MPT system.

Because an MPT may involve the exchange of a variety of information, some of which should be shielded from certain parties, cryptography or other means of protecting the information may be employed. This may be particularly useful in an embodiment of the invention in which elements of the MPT system are distributed, as offers may then reside virtually anywhere in the system's electronic environment. For example, digital signatures combined with digital certificates may be used to validate the authenticity of an offer, ensure that the contents of an offer originated with the purported creator(s) and generally provide a high level of trust, assurance and nonrepudiability.

Offers and messages exchanged in accordance with the MPT framework to close and fulfill an MPT should include all the information needed to provide payment to the brokers, suppliers, providers and any other value-adding parties to an MPT. Similarly, sufficient information should be included to allow a supplier, provider or other party to ascertain and perform its obligations (e.g., by informing the supplier of any product/service options specified by a buyer). In one embodiment of the invention XML (eXtensible Markup Language) is used within the MPT framework and may be augmented with various forms of cryptography (or other security protocols) such as cryptographic enveloping, digital signatures, digital certificates, etc.

Illustratively, a marketplace stores details concerning its offers and the transactions formed from them. Therefore, brokers can readily determine the status of their offers to see which have closed, how much money they owe or are owed, etc. Advantageously, the structure of the MPT system allows all offers in a MPT to be closed as a group, at which time the facilitator distributes payment to all parties—thus eliminating the need for each broker to make its own payments to its suppliers.

It should be understood that, in the presently described embodiment of the invention, each offer is a unique data structure and may be transportable (e.g., to different marketplaces), extendable (e.g., to be included with another offer), editable (e.g., by the offer creator or other authorized actor), copyable, self-terminating, self-perpetuating, etc.

The marketplace(s) established in accordance with one embodiment of the invention may be distributed or centrally located, both individually and as a whole. In other words, a single marketplace may consist of one or more servers or other computer systems in one or more locations and multiple marketplaces may be co-located or distributed. For example, in one implementation marketplaces may be configured as web pages or sites accessible via web browsers, in which case multiple marketplaces may be logically dispersed but physically close.

Within a marketplace, a consumer, supplier, broker, and any other party granted access to the marketplace can, depending on their level of access, view available offers, create new ones, alter the party's own offers and determine the status of existing offers. Thus, if an offer is accepted and closes, the party can determine how and when to fulfill its part of the agreement. In one alternative embodiment parties involved in an offer that is accepted are automatically notified (e.g., via electronic mail, facsimile, telephone) of the fact in order to speed the process of closing the MPT.

A present embodiment of the invention is particularly suited for use with a publicly accessible network such as the Internet. In one implementation of this embodiment offers may be constructed using XML (eXtensible Markup Language) or another software development tool or language compatible with the computer systems of a particular electronic environment. Offers may be viewed or presented in this embodiment on web pages using HTML (Hyper Text Markup Language) and other software tools and standards. More specifically, the language(s) and development aids used to implement this embodiment of the invention are not limited to those now known, nor is this embodiment limited to any particular network or computer environment. Elements of this embodiment of the invention (e.g., offers, marketplaces, facilitators)

may be widely or narrowly distributed in location and function. Other embodiments of the invention may be developed for different environments and networks, such as WANs (Wide Area Networks), LANs (Local Area Networks), intranets, etc., whether public or private in nature.

In a present embodiment of the invention multiple views of an MPO are enabled. A view may be considered to be an operation on the MPO, and may be active or passive in nature. Illustratively, an active view alters the MPO in some way, changes a state associated with it or may cause an external event to occur. In contrast, a passive view does not affect the MPO or any element (e.g., sub-offer) within it.

Among the passive views of an MPO in an embodiment of the invention is the market view, in which a marketplace visitor can peruse or list one or more offers. A media view, in which banner ads, hyperlinks, icons or other elements are displayed or associated with an offer is also passive, as is a broker view in which a broker or other party may view MPOs that they created and any associated sub-offers that they had the ability or permission to view. This embodiment may also include other passive views for examining an MPO without altering it, such as when an offer is communicated to someone (e.g., a travel agent forwards a Hawaiian vacation offer to a client) or when an offer creator or other party checks the status of the offer or an offer that encompasses it.

One active view occurs when a party attempts to close an offer, such as when a consumer issues or authorizes zero-sum offer 200 of FIG. 2 to be matched with offer bundle 114.

For different users, parties or marketplaces an offer or offer view may be presented with different appearances. Thus, the XML code representing an offer may serve as input to a customization process in which the generated display (e.g., in HTML on a web page) incorporates different elements or content depending on the circumstances. Views in a marketplace may, for example, be branded to reflect the organization operating, maintaining or supporting the marketplace.

In one embodiment of the invention a marketplace director or multi-party transaction facilitator operates an offer processing server to facilitate the closing of an MPO. Illustratively, the offer processing server exchanges messages with other MPO servers, such as servers operated by or in marketplaces and/or individual parties named or involved in a multi-party transaction offer or sub-offer.

In one implementation, transaction messages are composed according to one or more standard communication formats, such as RPC (Remote Procedure Call), XML over http (HyperText Transport Protocol), RMI (Remote Method Invocation), Corba, DCOM (Distributed COM). Advantageously, the use of a common set of messages and formats helps maintain the interoperability and integrity of the overall system and promotes uniform treatment of each offer or sub-offer in an MPO.

TABLE 4 lists a sample of the XML RPC calls or messages that may be exchanged between the various MPO servers, particularly during closing of an MPT, in an embodiment of the invention. In particular, in this embodiment information is exchanged (e.g., between parties, between a facilitator and a party) using an RPC technique that allows data to be exchanged over http, wherein the data is formatted according to XML. This messaging technique may be referred to as XML RPC.

TABLE 4

| XML RPC Call | Description/Action |
| --- | --- |
| Authorize | Initiates a transaction. Ex.: authorize a credit transfer, place hold on a product for use in satisfying an MPO. |
| Rollback Authorize | Undo a previous authorize. Ex.: remove authorization of credit transfer, cancel hold on product. |
| Commit | Commit a transaction. Ex.: Ship product. |
| Rollback Commit | Undo a previous commit, if possible. |
| Remit | Finalize a transaction. Ex.: capture credit card funds, remit payment to supplier(s). |
| Rollback Remit | Undo a previous remit, if possible. Ex.: perform charge-back to credit card, debit supplier account. |

Illustratively, to facilitate the exchange of messages during the creation, viewing, closing or other manipulation of an offer, the offer may include a messaging section that, among other uses, may specify a URI (Uniform Resource Identifier) or URL (Uniform Resource Locator) that identifies a messaging server or other server associated with the creator or supplier of the offer. With the URI, an MPO server may open a channel to the specified address and begin exchanging messages.

One or more variables are associated with MPOs, regardless of whether they are atomic or higher-level offers. These variables are associated with the offers as they are constructed, and may be stored in a database or other data structure so that they may be accessed when the messaging server associated with the MPO is contacted concerning an action or obligation of a party. The variables described below may be a subset or superset of the variables employed in an alternative embodiment of the invention.

In one embodiment of the invention a Maximum_Usage counter is an offer variable configured to indicate how many times an offer can be closed or accepted. Illustratively, for an atomic offer the Maximum_Usage counter may indicate how many units of a particular product are available or how many times a particular service may be provided under the terms of the offer. For a package offer, the Maximum_Usage counter may be set to the minimum Maximum_Usage counter of all the offers or sub-offers in the package.

In this embodiment an Expiry variable of an offer indicates the date and/or time at which the offer expires and can no longer be closed. For a package offer, the Expiry variable may be set to the lowest or earliest Expiry variable of the included offers. The Validity variable succinctly indicates whether the associated offer is valid. A supplier, for example, may initially set the validity variable to true for an offer and, if its inventory of the product or service drops too low or its costs make the offer untenable, may mark the offer invalid until the situation changes. Illustratively, the Validity variable for a package offer is set to the conjunction of the Validity variables for all included offers.

One Method of Closing a Multi-Party Transaction

As described above, in a present embodiment of the invention an MPO must be balanced with a suitable counter-offer in order to be closable. In other words, the sum of all values within the offer chain must be zero. As evidenced in the offer diagrams of FIGS. 2 and 3, a value (e.g., of a payment or a good/service) may be represented negatively when it is to be received by the offeror and positive when the offeror is providing it in exchange for other value. Although embodiments of the invention described above involve the exchange of goods/services for money, one alternative embodiment of the invention may be implemented for bartering, wherein one good or service is offered and exchanged for another.

In one embodiment of the invention a zero-sum offer is the top-level offer in a hierarchical MPO chain, such as offer 200 in FIGS. 2 and 3. Once zero-sum offer 200 of FIG. 2 is received for an existing offer (i.e., package offer 114), an MPT for the MPO can begin the closure process. In different implementations, depending on the context in which it is used a zero-sum offer may be used to identify the entire MPO chain of offers or the topmost offer that encloses all other offers.

Illustratively, the closing of an MPT is managed by an offer processing server, which may be operated by an MPT facilitator, a broker, a market director, a supplier or any other party. In one or more embodiments of the invention the offer processing server interacts with one or more other servers within the MPT system. The MPT system may span virtually any number and type of computers, communication devices, networks and enterprises that are electronically inter-connected.

The offer processing server may interact with a payment server in order to retrieve value (e.g., money or other transferrable value) from a consumer or credit it to a supplier. The offer processing server may also interact with one or more fulfillment servers in order to notify suppliers of their obligations and determine whether they have been satisfied. Illustratively, a fulfillment server may be any computer system associated with a supplier, consumer, broker or marketplace that assists in closing an MPT.

In one embodiment of the invention, when a zero-sum offer is in the process of being closed another offer variable—in addition to those described above—is initialized. This variable may be termed Close_State and indicates the state of the closure process for an offer within the MPT (i.e., on of the offers encompassed by the zero-sum offer). The initial value for the Close_State variable is "Open," which indicates that the closing process has just been initiated. Other possible values in a present embodiment include "Authorized," "Committed," "Remitted" and "Void." An Authorized offer is one that has been successfully authorized, which implies that funds have been marked for the transaction, products have been held for shipment, etc. An offer whose Close_State variable has the value Committed has been successfully committed, which means, for example, that all products being purchased have been shipped. The value Remitted indicates that all funds associated with the offer have been remitted—i.e., the consumer's funds have been captured and suppliers, brokers, and any other parties have been paid. A value of Void indicates that the offer has been cancelled or a closing step or action has failed.

One method of closing an MPT for zero-sum offer 200 of FIGS. 2 and 3 may now be described. FIGS. 4A-4E, discussed below, present a more detailed description of a closing process. A MPT can be defined to include all offers in the offer chain of the corresponding zero-sum offer. Therefore, Transaction={Offer 102, Offer 104, Offer 106, Offer 108, Offer 112, Offer 114, Offer 200}

The Expiry and Validity variables and the Maximum_Usage counter for the various offers must be consulted in order to determine if the transaction can be closed and how the offers in the offer chain may change as a result. The value of the Expiry variable for the transaction is equal to the earliest expiration date or time of the various offers. Therefore, the earliest expiration of offers 102, 104, 106, 108, 112, 114, 200 serves as the Expiry variable for the overall transaction.

Next, the Validity of the transaction can be ascertained by taking the conjunction of the several offers' Validity variables (e.g., by joining their Validity values with Boolean Ands). As long as each of the offers within the transaction is still valid, then the transaction itself is valid.

The Maximum_Usage counter for the transaction can be set according to the minimum Maximum_Usage counter of the offers within the MPT. In one particular embodiment of the invention, however, Maximum_Usage counters for each offer in a transaction are decremented as the offer is examined during closing, in order to lock or schedule the resources associated with the offer and prevent their over-subscription. If, of course, closure of the MPT fails, the Maximum_Usage counters are incremented to unlock those resources. Thus, in this embodiment the transaction may proceed (as far as the Maximum_Usage counter is involved) if, after examining each one, none of the offers has a Maximum_Usage counter below zero. Again, a value may be reported as zero because the check of the counter may cause it to be automatically decremented.

At the initiation of the closure process, the Close_State variable is set to Open for each of offers 102, 104, 106, 108, 112, 114, 200. If the current date/time is beyond the value of the transaction's Expiry variable or if the value of the Validity variable is false or any of the Maximum_Usage counters are less than zero, then the Close_State variable for zero-sum offer 200 is set to Void and any resources that were locked (e.g., in association with the Maximum_Usage counter check) are released.

In one implementation, an offer directly under a zero-sum offer (i.e., package offer 114 of FIG. 2, which zero-sum offer 200 was matched with) may also be invalidated if the Maximum_Usage counter check fails since they will also fail in any other attempts to close.

If the transaction is not void, then the Close_State variables for each offer that gives value to the transaction either monetarily or through a good or service (i.e., offers 102, 104, 106, 108, 200) are set to Authorized. The offer processing server handling the closing of the transaction may then interact with a payment server to ensure funds are available (i.e., for offer 200). Additionally, one or more fulfillment or other MPT servers may be contacted to determine if the necessary goods are available for shipment and any services can be provided (e.g., on the requested date, at the desired location). If any of the Authorized offers fails the authorization process, the transaction is voided and any resource locks are released.

In this embodiment of the invention, the XML RPC messages that are exchanged during the authorization phase (and/or any other portion of the closing process) may be generic, in that the messages need not contain any business or offer-specific information other than the positive and negative values. Thus, an offer processing or facilitator module that handles the authorization phase and sends authorization messages need not treat an authorization message for payment authorization any different than a message for an inventory hold or other action. Illustratively, the receiving entity (e.g., a server associated with a party to, or intermediary involved in, the MPT) understands how to interpret the message and take appropriate action.

If offers 102, 104, 106, 108, 200 authorize successfully, the suppliers' offers are then committed. Illustratively, their Close_State variables are set to Committed and shipment of goods and performance of services are requested. Because the necessary resources were already authorized (e.g., meaning they are available), commitment failure should only occur in exceptional circumstances (e.g., natural disaster, force majeure).

Finally, all the offers are finalized and their Close_State variables set to Remitted by disbursing funds received from the consumer to each broker, supplier or other party.

With reference now to FIGS. 4A-4E, a more detailed description of a closing process is depicted for a present embodiment of the invention, using the MPOs of FIG. 2 as a reference. The illustrated closing process can be logically separated into four phases—Verification (FIG. 4A), Authorization (FIG. 4B), Commitment (FIG. 4C) and Remittance (FIG. 4D), which are similar to the procedures described above. Although depicted as occurring in serial manner in FIGS. 4A-4E, in one alternative embodiment of the invention one or more phases (or actions within a phase) may be performed concurrently or nearly concurrently. Thus, the scope of the invention is not limited to the order in which the many actions comprising the closing process are depicted in FIGS. 4A-4E, but rather extend to all methods that may be derived from the illustrated process.

Figure 4A:
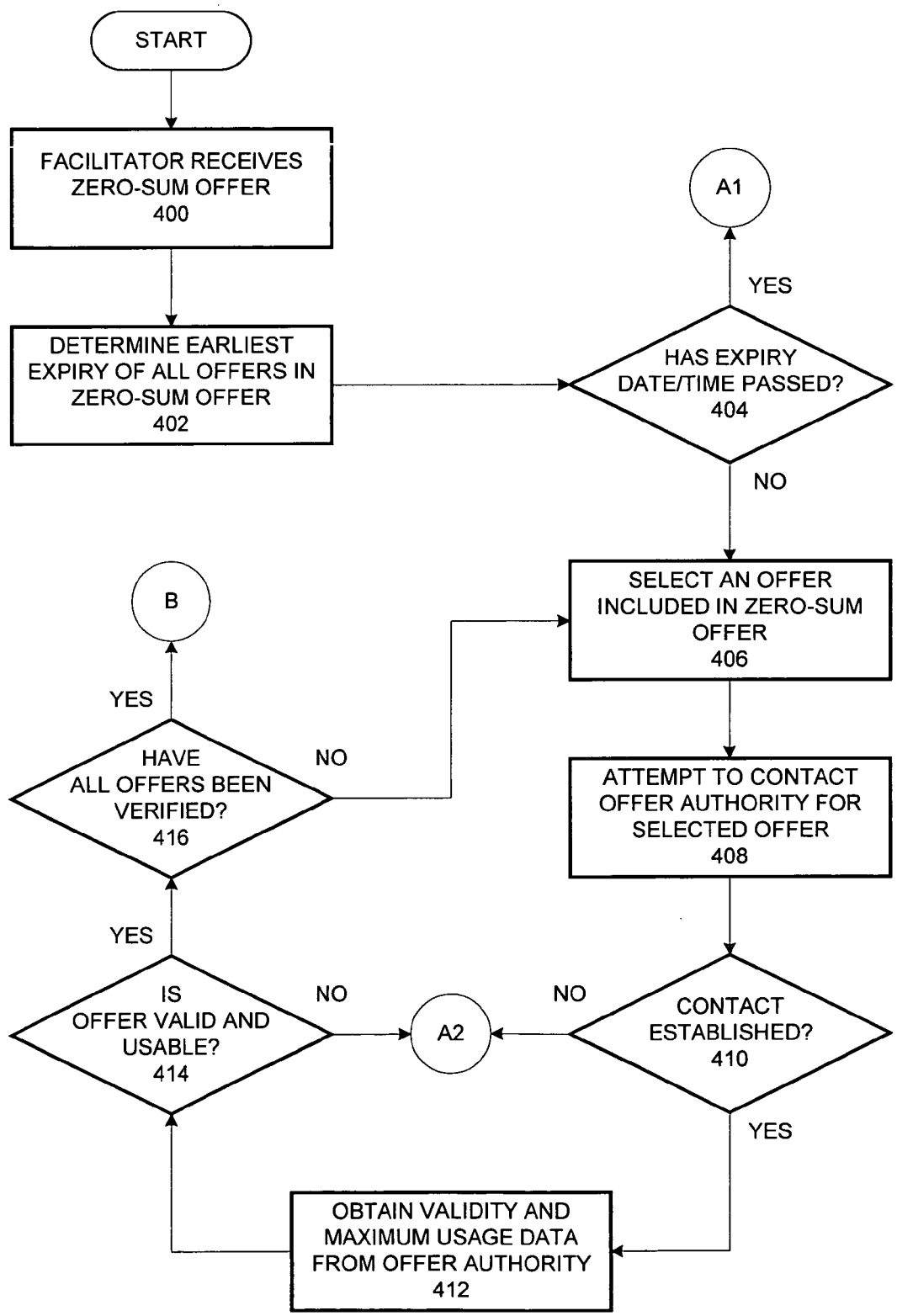
FIGS. 4A-4E are flowcharts depicting one method of closing a multi-party transaction according to an embodiment of the invention.
Figure 4B:
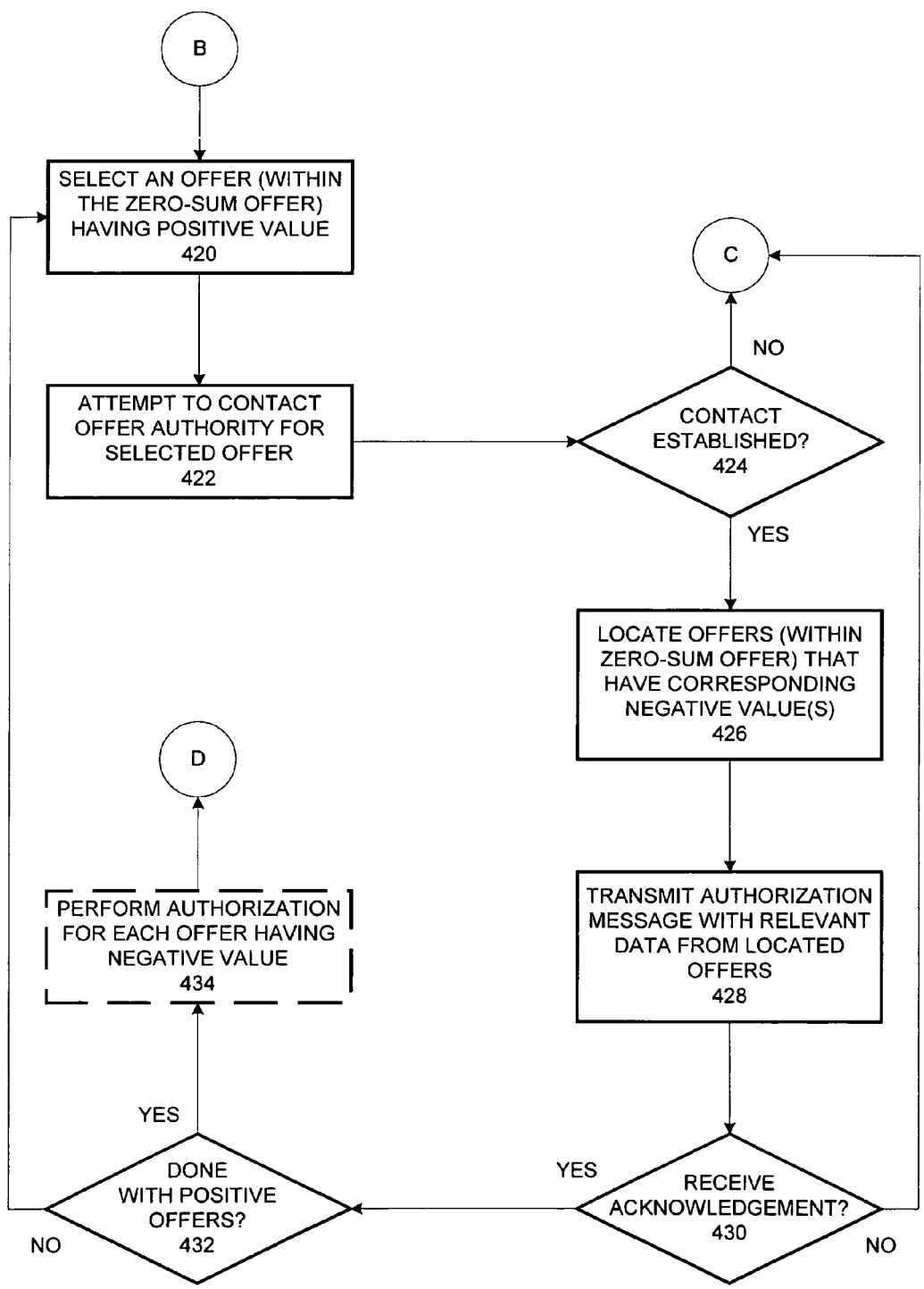

In FIG. 4A, the illustrated closing process commences when an MPT facilitator receives a zero-sum offer (e.g., zero-sum offer 200 of FIG. 2) in state 400. The facilitator may be an offeror of one of the offers encompassed within the zero-sum offer, may be a broker, a supplier, a consumer, or may be affiliated with a marketplace or may be an independent or semi-independent party. In the illustrative embodiment, the zero-sum offer is received in fully resolved form, including the matching offer (package offer 114) and any other offers associated with the matching offer. Zero-sum offer 200 of FIG. 2 may be considered to be coupled to, encompass, include, or match offers 102, 104, 106, 108, 112, 114.

In one alternative embodiment the facilitator receives only a zero-sum offer reference and therefore takes action to resolve it (e.g., by contacting MPT servers that host or store the various offers). The MPT that is formed from the zero-sum offer thus includes the zero-sum offer and all offers encompassed or connected to it.

In this embodiment the zero-sum offer is forwarded to the facilitator when the consumer who is viewing various offers (e.g. including package offer 114) chooses to accept one. The acceptance may be made through the consumer's browser or other computerized user interface, may be done telephonically, via electronic mail, by an automated process, or may even be done on the consumer's behalf by a broker or other party. However the consumer or other party accepts the selected offer, the zero-sum offer is created and forwarded electronically to the facilitator. In one alternative embodiment in which a consumer, broker or other party employs an automated system to accept offers meeting certain criteria, the automated system forwards the zero-sum offer to the facilitator.

Also in state 400, the facilitator may set the Close_State variable for each of the offers within the MPT to Open to indicate the commencement of the closing process.

The verification phase of the illustrated closing process then begins in state 402 (and may be considered to last through state 418 in the case in which verification is successful). In state 402 the facilitator each offer in the MPT to determine which as the earliest Expiry variable. Illustratively, each offer includes an Expiry value indicating when it expires. If one does not, it may be assumed to never expire or the facilitator may contact an entity associated with the offer to determine if it has expired.

In state 404 the facilitator determines whether that Expiry date/time has already passed. If so, the illustrated process proceeds to state 498 to notify the consumer who issued zero-sum offer 200 that the transaction failed; the process then exits. The consumer may or may not be informed why the MPT failed (i.e., in this context, because an offer expired). As explained below, other action may be taken when an MPT fails (e.g., to inform the offeror of an expired offer, to have an expired offer deleted).

If the Expiry date/time has not passed, then in state 406 a first offer within the MPT is selected for verification. In state 408 the facilitator attempts to contact an offer authority associated with the selected offer. The offer authority may be the party offering something of value in the offer (e.g., a good or service, payment for a good or service), the entity that initiated the offer, a broker or agent handling business affairs for the party, etc.

An offer authority may serve one or more individual parties and may serve as the authority for all or just part of an offer. For example, if an offer consists of multiple items or components, different offer authorities may be identified for different components. Illustratively, an offer contains one or more message sections in which, among other things, an offer authority may be identified.

Also, a given party (e.g., consumer, supplier) may be associated with multiple offer authorities. For example, a supplier may be associated with a first offer authority (e.g., a broker, a distributor) for handling, processing or closing on goods or services that the supplier provides. The supplier may be associated with a different offer authority (e.g., a bank) for receiving funds as payment for the goods or services. The term "offer authority" is used herein to refer to both the organization or individual serving as an offer authority and the automated systems that are employed to assist the offer authority in closing an offer or transaction.

In the presently described embodiment the authority associated with each offer is identified, in the offer itself, by a URI/URL (Universal Resource Identifier/Locator) or other identifier. Contact may be established through one or more networks or other data links (e.g., the Internet, an intranet, WAN, LAN), may include wired and/or wireless links and may employ virtually any communication protocol(s). In alternative embodiments contact may be established using any communication means and mechanisms that allow the various actions and communications described herein.

In state 410, if the offer authority could not be contacted then the MPT fails and the process continues at state 496, where the verification phase is undone (to the extent necessary), the consumer is notified and the process exits. For example, and as described further below, if one or more offer authorities were successfully contacted prior to one that fails, then the successfully contacted one may need to be informed that the MPT has been cancelled. In one alternative embodiment, an MPT may simply be postponed, revised or the facilitator may attempt to contact the non-communicative offer authority again.

If, however, the facilitator establishes contact with the offer authority, then in state 412 the facilitator elicits Validity and Maximum_Usage data from the authority. In this embodiment of the invention the Validity variable and the Maximum_Usage counter described above are not stored as part of individual offers, but rather are maintained by the offer authority.

In this embodiment, because this information is stored with the offer authority, offers are immutable once they are created. This makes them mobile, so that they can be reused and closed in different contexts and MPOs. Therefore, the offer authority may be better able to update the validity and usability of the offer because it stores the necessary information. Alternatively, however, the Validity variable and Maximum_Usage counter may be stored or maintained in each offer, in which case offers could be changeable after their creation. But, under this alternative an offer would have to be located and examined each time it was to be used, thereby making it less mobile.

Illustratively, the offer authority decrements the Maximum_Usage counter in association with reporting the usability of the offer. An offer may thus be considered usable if the offer authority reports a number greater than or equal to zero (e.g., indicating how many more times, after the present MPT, that the offer can be used). In alternative embodiments the usability of an offer may be reported in other ways. For example, the offer authority may simply report whether or not the Maximum_Usage counter (or other data) indicates that the offer is still usable (i.e., without indicating a quantity). Or, the authority may report the pre-decremented value of the Maximum_Usage counter. In short, the offer authority maintains the necessary validity and usability/availability information for the offer and informs the facilitator whether the offer is valid and usable.

In state 414, the facilitator examines the information returned by the offer authority to determine if the offer has been verified (i.e., whether it is valid and usable). If not, then the illustrated process advances to state 496 to undo the verification phase, as much as necessary and possible, notify the consumer of the failure of the MPT, and exit.

If the offer is verified, then in state 416 the facilitator determines if it has verified all offer in the MPT. If not, then the process returns to state 406 to select another one. Otherwise, the process advances to state 420 to begin the authorization phase of closing. In one embodiment of the invention a zero-sum offer is considered "transactable" when it successfully passes the verification phase. In another embodiment, however, a zero-sum offer may be considered transactable as soon as it is formed (and matches the relevant terms of the offer it encompasses).

In the illustrated closing process, state 420 commences an authorization phase, which may include states 420 through 434 for a successful MPT. In state 420 the facilitator selects a first MPT offer that indicates a positive value. As described previously, when consumers, suppliers, brokers and any other parties offer to give or provide value (e.g., money, a good or service) in exchange for something else (e.g., some other form of value), the value they offer may be represented with a positive amount. Conversely, the value that a party receives may be represented with a negative amount. Thus, in zero-sum offer 200 of FIG. 2, the consumer's offer of $165.00 may be represented positively, while the rollerblade package amount (i.e., one) is represented negatively. Similarly, in offer 102 the value that the supplier is providing (i.e., a pair of rollerblades) is represented with a positive amount (i.e., one), while the value that the supplier receives in exchange (i.e., $57.50) is represented negatively. And, the consumer's offer also includes a negative amount for the value that the consumer is receiving (e.g.,—one rollerblade).

Thus, in state 420 the facilitator selects one of the offers that adds positive value. Again, the amount may be a payment offered by a consumer, a good or service offered by a supplier, some other value offered by a broker or other party, etc. If an offer adds multiple positive values, states 420 through 432 may be performed for each one in turn, or the may be performed concurrently.

In state 422 the facilitator attempts to contact the offer authority for the selected offer. The authority may be identified in the offer itself (e.g., by a URI, URL, other network address).

In state 424 the facilitator determines whether the contact was successful. If not, the illustrated process advances to state 494 to undo the authorization and verification phases, to the extent necessary and possible, to notify the consumer of the failed MPT and exit. In alternative embodiments, contact may be attempted multiple times before canceling the MPT. As described below, the facilitator may take additional action concerning an unavailable offer authority (e.g., postpone the MPT).

If the contact was established, in state 426 the facilitator locates the MPT offers that have negative amounts for the selected positive value. For example, if the positive value is a good or service offered by a supplier, the MPT locates the offer(s) that receive the good or service. If the positive value is a payment, the MPT locates the offer(s) the receive the proceeds.

In state 428 the facilitator transmits an authorization to the offer authority associated with the selected offer having positive value. Illustratively, the authorization message informs the authority that the offer is being transacted. Also, if the located offers having a corresponding negative value or component provide data needed by the offer authority or offeror of the positive component, that data is provided to the authority. For example, if a good or service offered by a supplier has options selectable by the consumer (e.g., color, size, shipping address, date) and the offer(s) having corresponding negative value provide(s) choices for such options, those choices are communicated to the offer authority. This data may be necessary in order for the offer authority to determine if the offer can be satisfied (e.g., to determine if the exact product is in stock, if the service can be provided on the desired day).

One purpose of the authorization message, therefore, is to notify parties that their offers are being transacted and ensure that they are prepared to satisfy the terms of the offer. Thus, when an offer authority receives an authorization message it may determine whether it is willing to proceed and capable of doing so. In addition, a supplier of goods or services is expected to hold the goods or services for delivery or performance, and funds of a party making payment (e.g., the consumer) are obligated (e.g., credit card funds are held). The authorization phase may therefore serve as a party's last chance to renege on, or gracefully back out of, an offer. The offer authority should return an acknowledgement or assurance that it can perform its obligation.

In state 430 the facilitator determines whether the offer authority has acknowledged the authorization message. If not, multiple attempts may be made but if no acknowledgement is received or if the offer authority sends a response other than an acknowledgement (e.g., a cancellation) then the process continues at state 494 to undo the authorization and verification phases, to the extent necessary and possible, and notify the consumer that the MPT has failed. The illustrated process then exits.

If, however, an authorization acknowledgement is received then in state 432 the facilitator determines if it has completed authorization for each offer having positive value and for each positive value within an offer (e.g., an offer may include more than one positive value). If not, then the process returns to state 420 to select another offer or another positive component of an offer.

But if all positive components of offers in the MPT have been successfully authorized, then in state 434 the facilitator may (i.e., state 434 is optional) also authorize all negative components of offers in the MPT. This may entail performing actions similar to those of states 420 through 432 of FIG. 4B. In effect, though, authorization of negative offer components may simply amount to notifying offer authorities that they should expect to receive a specified value (e.g., money in exchange for a good or service they are supplying, or vice versa). Thus, it may be helpful to notify these offer authorities of the progress of a transaction, but no response or acknowledgement may be expected or required.

After optional state 434 the illustrated process proceeds to state 440 and the commitment phase.

Figure 4C:
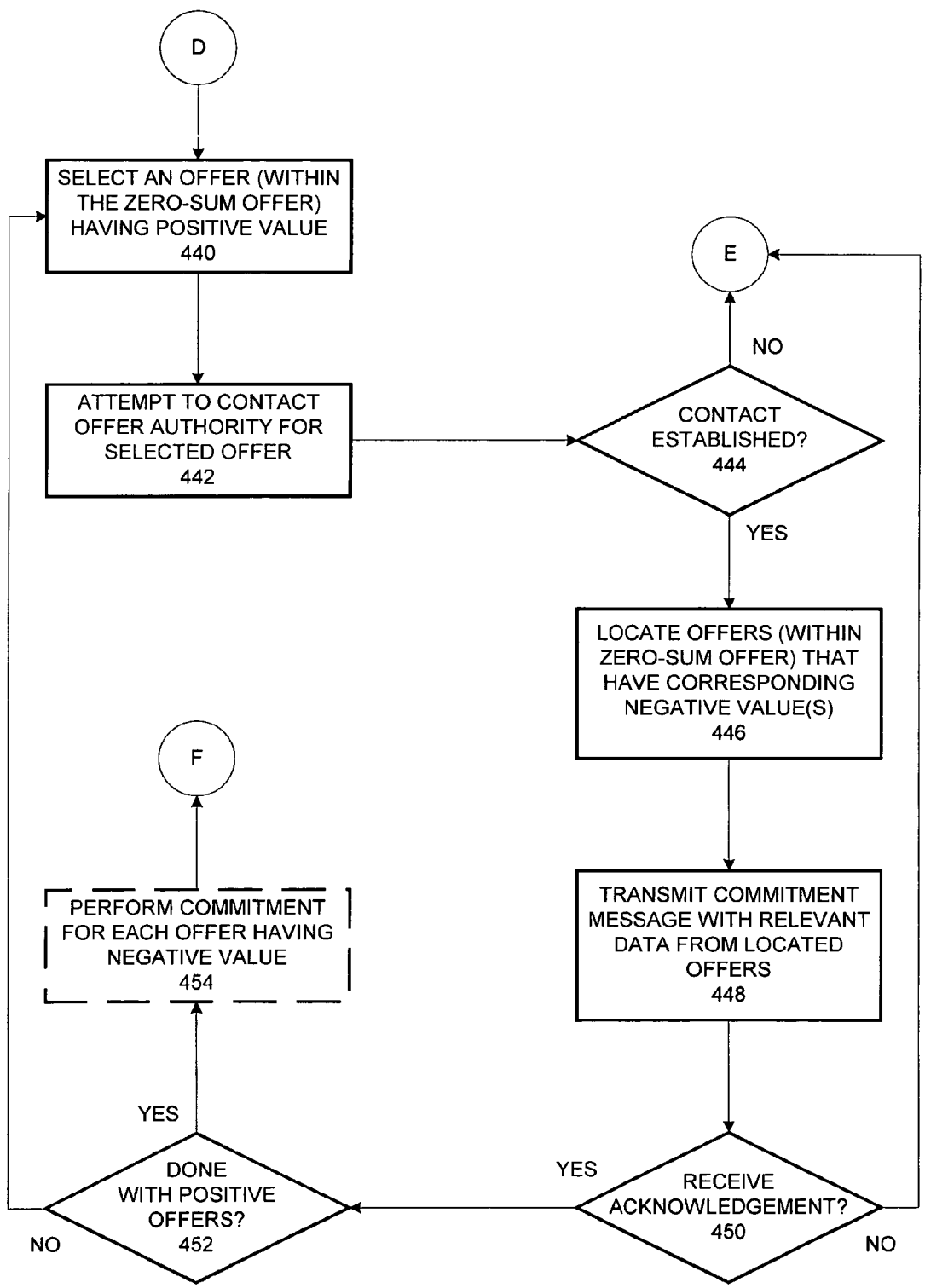
Figure 4D:
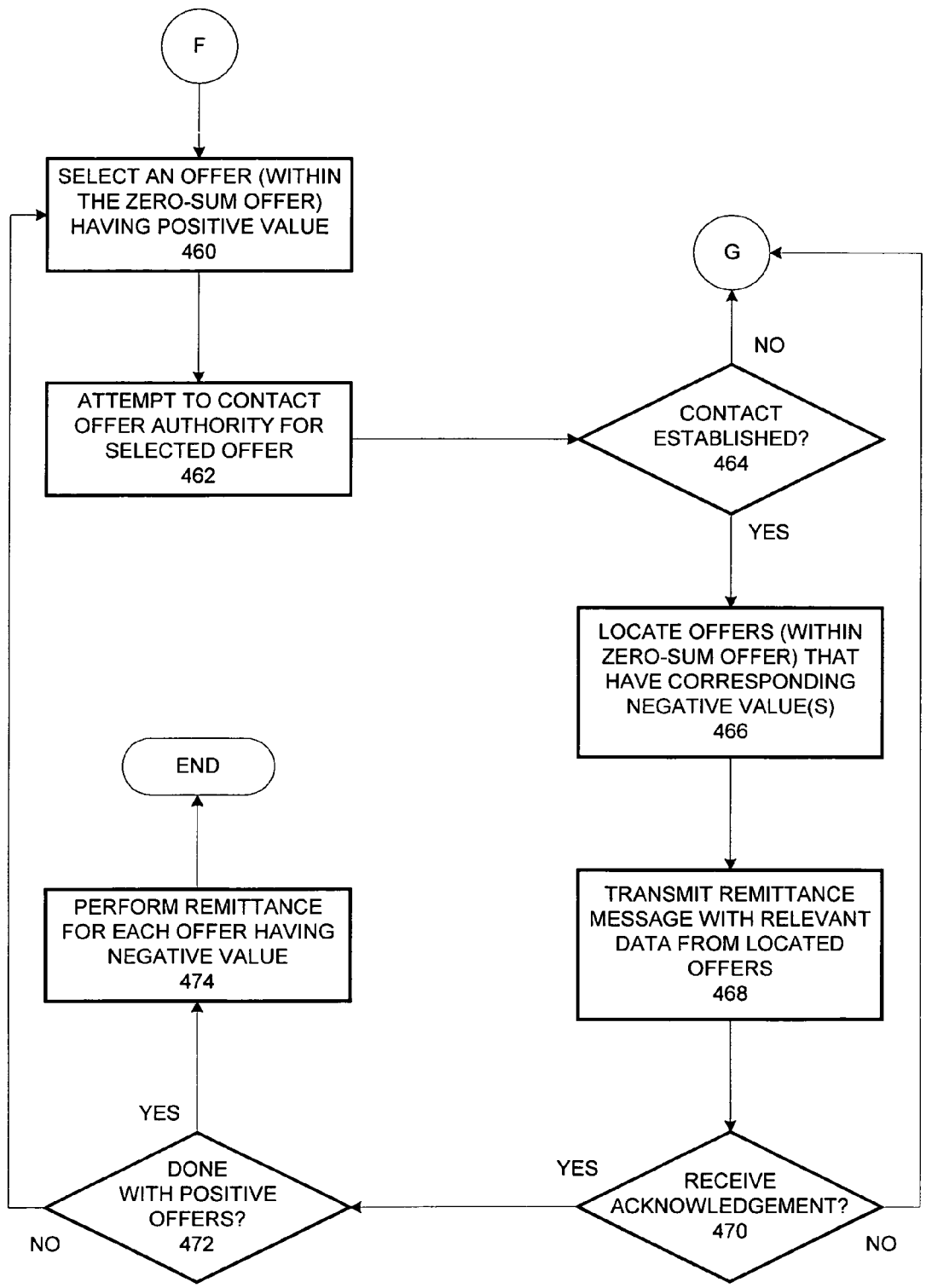
Figure 4E:
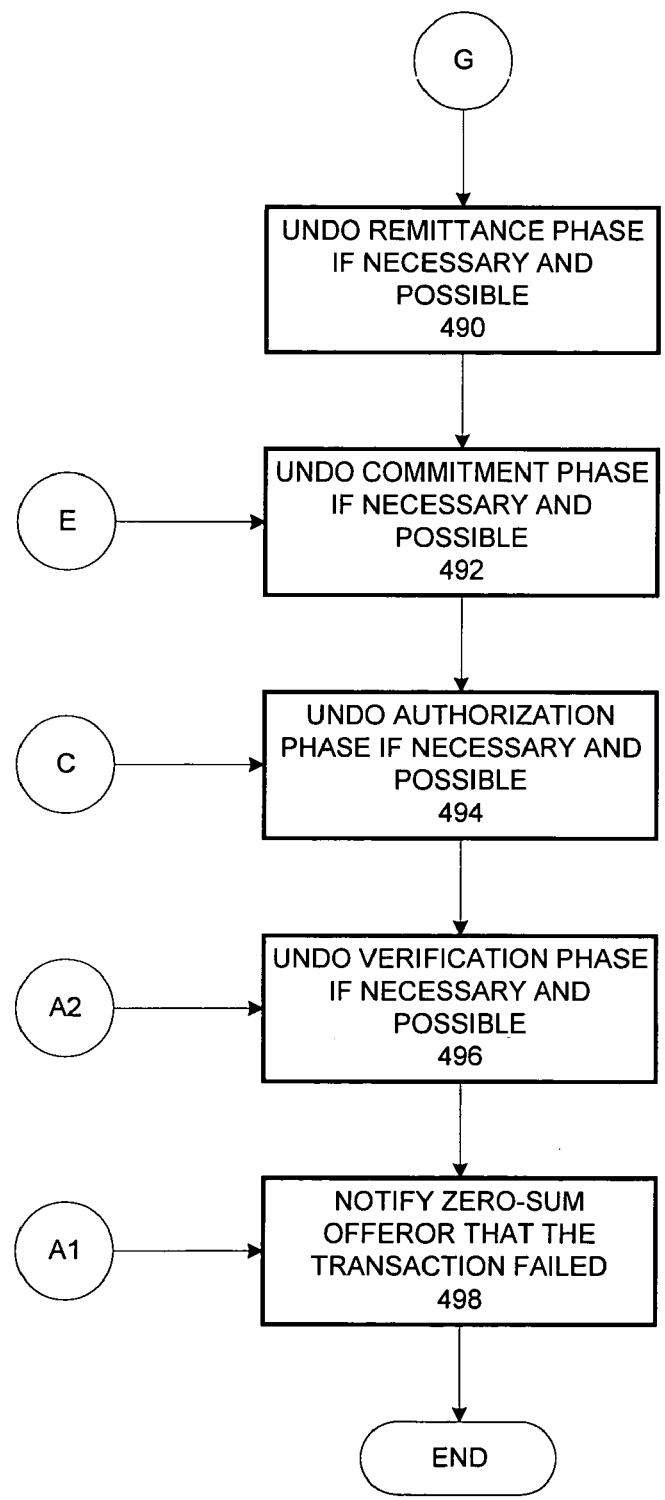

In the illustrated embodiment of the invention state 440 of FIG. 4C may commence a commitment phase of the closing process, which may be considered to last through state 454 for successful transactions. States 440-454 are similar in action to states 420-434 of the authorization phase (FIG. 4B) and therefore need not be described in as much detail.

In states 440-442, a positive component of a transaction offer is selected and the facilitator attempts to contact the associated offer authority. In state 444, if contact fails the process advances to state 492 to undo the commitment, authorization and verification phases as much as necessary and possible, after which the consumer is notified of the MPT failure and the process exits. For example, if a supplier's offer successfully committed before the transaction failed, that supplier may or should have already shipped its goods. It may be difficult or even impossible to completely undo the transaction, in which case human intervention may be required to make the parties whole or determine appropriate recourse.

In states 446-448 the facilitator again notifies the offer authority, this time in a commitment message, of the offer(s) that are being transacted and any necessary or helpful transaction terms or details. Upon receipt of a commitment message, a supplier is expected to ship its goods or arrange for performance of its services. The goods/services should have been held or reserved in response to the authorization message.

If, in state 450, the offer authority fails to acknowledge the commitment message or responds that it cannot commit to the transaction or terms of the offer as they stand, the illustrated process advances to state 492. In one embodiment of the invention an offer authority may, during the authorization or commitment phase, respond with alternative terms (e.g., a different product, different options or terms). The facilitator may reject any attempts to change an offer or transaction or may take action to amend the transaction according to the terms if acceptable to other concerned parties.

In state 452 the process returns to state 440 if additional offers or positive components of offers remain to be processed. Otherwise, optional state 454 may be performed to carry out the commitment phase for negative components of offers. As with state 434, state 454 may be performed for all or any subset of the negative components within the transaction. The process then proceeds to the remittance phase in state 460.

The remittance phase of states 460-474 (FIG. 4D) in the illustrated embodiment is similar to the commitment and authorization phases. One difference in this embodiment is that the remittance phase is intended to obtain payment from appropriate parties (e.g., the consumer) and disburse funds to brokers, suppliers and other parties as necessary to satisfy the financial terms of the transaction. This may be contrasted with the commitment phase of the illustrated embodiment, which is intended to spur recipients of those funds to ship or provide the specified goods/services.

Illustratively, the remittance phase is performed for all offers and offer components, whether positive or negative in magnitude. Thus, each party involved in the MPT has, by the end of the remittance phase, provided its value and is notified that the value to be received in exchange has or is being transferred. If an offer fails during the remittance phase, the process advances to state 490. For successful MPTs, the illustrated process ends after state 474.

For unsuccessful transactions, any or all of states 490-498 are performed, depending on when the transaction failed. In states 490-496, the remittance, commitment, authorization and verification phases are undone, respectively, to the extent necessary and possible. In state 498 the consumer or other offeror responsible for zero-sum offer 200 is notified of the transaction failure. The illustrated process then exits.

In states 490-496, the facilitator attempts to reverse all the actions that were taken up to the point of MPT failure. However, once the commitment phase begins it may be difficult, if possible at all, to fully reverse the transaction without human intervention. Thus, in different embodiments of the invention states 490-498 may be completely or only partially automated. Where possible, however, the facilitator will undo payments, shipments, holds on shipments and transfers, etc., and restore each party and offer authority to their statuses prior to the initiation of the MPT.

Upon failure of an MPT the facilitator may notify concerned parties of the reason for failure. Thus, the MPT failed because an offer's Expiry date passed, that offer may be deleted from its marketplace or other location. An offer authority or offeror may be informed when any portion of an offer associated with that authority fails, so that the offer can be amended or revoked if necessary. Parties that exhibit a pattern or history of misbehavior (e.g., failure to ship goods, repudiating a transaction) may be warned, barred from using a marketplace or making transactions, may be identified to other parties, etc. Thus, the information gathered by the facilitator may be shared, within applicable legal boundaries, with market directors, brokers, suppliers, consumers and other parties.

The foregoing descriptions of embodiments of the invention have been presented for purposes of illustration and description only. They are not intended to be exhaustive or to limit the invention to the forms disclosed. Accordingly, the above disclosure is not intended to limit the invention; the scope of the invention is defined by the appended claims.

What is claimed is:

1. A method for transacting multi-party electronic commerce over a network, comprising:
    creating a plurality of atomic offers associated with a plurality of suppliers;
    creating a plurality of hierarchical offers based on the plurality of atomic offers, the plurality of hierarchical offers including:
    at least one first-level offer including at least a first one of the plurality of atomic offers, and
    at least one second-level offer including the first-level offer and at least a second one of the plurality of atomic offers not included within the first-level offer,
    creating at least one counter offer associated with a consumer;
    storing the plurality of atomic offers, the plurality of hierarchical offers and the counter offer in a computer memory:
    matching the counter offer to one of the plurality of hierarchical offers to create a zero-sum offer; and
    closing the zero-sum offer,
    wherein the first one of the plurality of atomic offers is an atomic offer for a first good or service, and the second one of the plurality of atomic offers is an atomic offer for a second good or service different from the first good or service.

2. The method of claim 1, wherein:
    each of the plurality of atomic offers include an atomic offer description and an atomic offer price;
    each first-level offer includes:
    a first-level fee,
    a first-level description based on each of the included atomic offer descriptions, and a first-level price based on the first-level fee and each of the included atomic offer prices;

each second-level offer includes:
- a second-level fee,
- a second-level description based on the first-level description and each of the included atomic offer descriptions, and
- a second-level price based on the second-level fee, the first-level price, and each of the included atomic offer prices;

the counter offer includes a counter offer description and a counter offer price; and said matching the counter offer includes comparing the counter offer description and price to each first-level and second-level description and price, respectively, to determine a match.

3. The method of claim 1, wherein the zero-sum offer includes an atomic offer corresponding to each of the atomic offers included within the first-level and second-level offers.

4. The method of claim 3, further comprising:
determining whether each atomic offer included within the zero-sum offer is expired, invalid or unavailable; and
if so determined, not closing the zero-sum offer.

5. The method of claim 3, wherein said closing the zero-sum offer includes closing each atomic offer included within corresponding first-level and second-level offers.

6. The method of claim 4, wherein said closing each atomic offer includes:
sending a payment based on the atomic offer price from the consumer to the supplier associated with the atomic offer; and
at least one of:
- shipping a product associated with the atomic offer to the consumer, and
- providing a service associated with the atomic offer to the consumer.

7. A computer readable medium including instructions adapted to be executed by a processor to perform a method for transacting multi-party electronic commerce over a network, the method comprising:
creating a plurality of atomic offers associated with a plurality of suppliers;
creating a plurality of hierarchical offers based on the plurality of atomic offers, the plurality of hierarchical offers including:
- at least one first-level offer including at least a first one of the plurality of atomic offers, and
- at least one second-level offer including the first-level offer and at least a second one of the plurality of atomic offers not included within the first-level offer;
creating at least one counter offer associated with a consumer;
storing the plurality of atomic offers, the plurality of hierarchical offers and the counter offer in a memory;
matching the counter offer to one of the plurality of hierarchical offers to create a zero-sum offer; and
closing the zero-sum offer,
wherein the first one of the plurality of atomic offers is an atomic offer for a first good or service, and the second one of the plurality of atomic offers is an atomic offer for a second good or service different from the first good or service.

8. The computer readable medium of claim 7, wherein:
each of the plurality of atomic offers include an atomic offer description and an atomic offer price;
each first-level offer includes:
- a first-level fee,
- a first-level description based on each of the included atomic offer descriptions, and
- a first-level price based on the first-level fee and each of the included atomic offer prices;
each second-level offer includes:
- a second-level fee,
- a second-level description based on the first-level description and each of the included atomic offer descriptions, and
- a second-level price based on the second-level fee, the first-level price, and each of the included atomic offer prices;
the counter offer includes a counter offer description and a counter offer price; and
said matching the counter offer includes comparing the counter offer description and price to each first-level and second-level description and price, respectively, to determine a match.

9. The computer readable medium of claim 7, wherein the zero-sum offer includes an atomic offer corresponding to each of the atomic offers included within the first-level and second-level offers.

10. The computer readable medium of claim 8, further comprising:
determining whether each atomic offer included within the zero-sum offer is expired, invalid or unavailable; and
if so determined, not closing the zero-sum offer.

11. The computer readable medium of claim 8, wherein said closing the zero-sum offer includes closing each atomic offer included within corresponding first-level and second-level offers.

12. The computer readable medium of claim 10, wherein said closing each atomic offer includes:
sending a payment based on the atomic offer price from the consumer to the supplier associated with the atomic offer; and
at least one of:
- shipping a product associated with the atomic offer to the consumer, and
- providing a service associated with the atomic offer to the consumer.

13. A system for transacting multi-party electronic commerce over a network, comprising:
an offer processing server, having a memory and coupled to a network, adapted to:
- create a plurality of atomic offers associated with a plurality of suppliers,
- create a plurality of hierarchical offers based on the plurality of atomic offers, the plurality of hierarchical offers including:
  - at least one first-level offer including at least a first one of the plurality of atomic offers, and
  - at least one second-level offer including the first-level offer and at least a second one of the plurality of atomic offers not included within the first-level offer,
- create at least one counter offer associated with a consumer,
- store the plurality of atomic offers, the plurality of hierarchical offers and the counter offer in the memory,
- match the counter offer to one of the plurality of hierarchical offers to create a zero-sum offer, and
- close the zero-sum offer;
wherein the first one of the plurality of atomic offers is an atomic offer for a first good or service, and the second one of the plurality of atomic offers is an atomic offer for a second good or service different from the first good or service;

a payment server, coupled to the network, to exchange payments between the consumer and the plurality of suppliers; and a fulfillment server, coupled to the network, to exchange messages associated with the zero-sum offer between the consumer and the plurality of suppliers.

14. The system of claim 13, wherein:

each of the plurality of atomic offers include an atomic offer description and an atomic offer price;

each first-level offer includes:
  a first-level fee,
  a first-level description based on each of the included atomic offer descriptions, and
  a first-level price based on the first-level fee and each of the included atomic offer prices;

each second-level offer includes:
  a second-level fee,
  a second-level description based on the first-level description and each of the included atomic offer descriptions, and
  a second-level price based on the second-level fee, the first-level price, and each of the included atomic offer prices;

the counter offer includes a counter offer description and a counter offer price; and said match the counter offer includes to compare the counter offer description and price to each first-level and second-level description and price, respectively, to determine a match.

15. The system of claim 13, wherein the zero-sum offer includes an atomic offer corresponding to each of the atomic offers included within the first-level and second-level offers.

16. The system of claim 14, wherein the offer processing server is further adapted to:
  determine whether each atomic offer included within the zero-sum offer is expired, invalid or unavailable; and
  if so determined, not close the zero-sum offer.

17. The system of claim 14, wherein said close the zero-sum offer includes to close each atomic offer included within corresponding first-level and second-level offers.

18. The system of claim 16, wherein said close each atomic offer includes to:
  send a payment based on the atomic offer price from the consumer to the supplier associated with the atomic offer; and
  at least one of:
    ship a product associated with the atomic offer to the consumer, and
    provide a service associated with the atomic offer to the consumer.

* * * * *

UNITED STATES PATENT AND TRADEMARK OFFICE
CERTIFICATE OF CORRECTION

| | | |
|---|---|---|
| PATENT NO. | : 7,536,336 B1 | Page 1 of 1 |
| APPLICATION NO. | : 09/575088 | |
| DATED | : May 19, 2009 | |
| INVENTOR(S) | : Daniel J. Guinan | |

It is certified that error appears in the above-identified patent and that said Letters Patent is hereby corrected as shown below:

In the specification,

Col. 7, line 35, change "directly" to --directing--;

Col. 12, line 5, change "for a" to --fora--;

Col. 12, line 31, after "rules", insert --of--;

Col. 12, line 32, after "rules", insert --of--; (first occurrence)

Col. 19, line 53, after "facilitator", insert --views--;
       line 54, change "as" to --is--;

Col. 21, line 56, change "the" to --they--;

Col. 22, line 9, change "the" (third occurrence), to --that--.

Signed and Sealed this
Eighth Day of December, 2015

Michelle K. Lee
*Director of the United States Patent and Trademark Office*